(12) United States Patent
Kitazawa et al.

(10) Patent No.: US 7,624,940 B2
(45) Date of Patent: Dec. 1, 2009

(54) WEBBING RETRACTOR

(75) Inventors: Yasuho Kitazawa, Aichi (JP);
Tomonori Nagata, Aichi (JP); Hitoshi Takamatsu, Aichi (JP); Masaki Yasuda, Aichi (JP); Toshio Nakashima, Aichi (JP); Kazuhiko Aihara, Aichi (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 208 days.

(21) Appl. No.: 11/322,655

(22) Filed: Jan. 3, 2006

(65) Prior Publication Data
US 2006/0144983 A1   Jul. 6, 2006

(30) Foreign Application Priority Data
Jan. 6, 2005   (JP)   ............... 2005-001222

(51) Int. Cl.
*B60R 22/405* (2006.01)
*B60R 22/40* (2006.01)
*B60R 22/46* (2006.01)

(52) U.S. Cl. .................. 242/374; 242/383.4; 242/384.6

(58) Field of Classification Search ................ 242/374, 242/379.1, 384, 384.5, 384.6; 280/805, 806, 280/807; 297/472, 476, 478, 480
See application file for complete search history.

(56) References Cited

U.S. PATENT DOCUMENTS

| | | | | |
|---|---|---|---|---|
| 4,014,479 A * | 3/1977 | Nilsson et al. | ............... | 242/374 |
| 4,372,501 A * | 2/1983 | Inukai | ............... | 242/374 |
| 4,455,000 A * | 6/1984 | Nilsson | ............... | 242/374 |
| 5,653,398 A | 8/1997 | Foehl et al. | | |
| 6,343,522 B1 * | 2/2002 | Hori et al. | ............... | 74/422 |
| 6,343,758 B1 * | 2/2002 | Abe et al. | ............... | 242/374 |
| 6,354,528 B1 * | 3/2002 | Nagata et al. | ............... | 242/374 |
| 6,460,935 B1 | 10/2002 | Rees et al. | | |

(Continued)

FOREIGN PATENT DOCUMENTS

EP   1243487 A2   9/2002

(Continued)

OTHER PUBLICATIONS

Office Action issued by Japanese Patent Office in corresponding Japanese Patent Application No. 2005-001222 dated Sep. 1, 2009.

*Primary Examiner*—John Q. Nguyen
*Assistant Examiner*—Scott Haugland
(74) *Attorney, Agent, or Firm*—Roberts Mlotkowski Safran & Cole, P.C.; Thomas W. Cole

(57) ABSTRACT

A webbing retractor which can prevent gas, which is for rotating a take-up shaft in a take-up direction, from affecting other structural parts. In the webbing retractor, when a pretensioner mechanism operates, gas for operation within a cylinder is exhausted toward a pinion via a gas venting hole formed in a flange portion of a piston. Because a blocking wall is provided between the pinion and an acceleration sensor, exhausted gas passes between the pinion and the blocking wall, and is exhausted to an outer side of the webbing retractor from an upper end side of a cover plate or the like. In this way, blowing-out of the exhausted gas onto the acceleration sensor is blocked, and the exhausted gas can be prevented from affecting the acceleration sensor.

8 Claims, 3 Drawing Sheets

U.S. PATENT DOCUMENTS

| | | | |
|---|---|---|---|
| 6,698,677 B1 * | 3/2004 | Happ et al. | 242/374 |
| 2002/0005640 A1 | 1/2002 | Nagata et al. | |
| 2004/0227030 A1 * | 11/2004 | Nagata et al. | 242/374 |

FOREIGN PATENT DOCUMENTS

| | | |
|---|---|---|
| JP | 6-336147 A | 12/1994 |
| JP | 8-133015 | 5/1996 |
| JP | 2000-302012 A | 10/2000 |

* cited by examiner

WEBBING RETRACTOR

CROSS-REFERENCE TO RELATED APPLICATION

This application claims priority under 35 USC 119 from Japanese Patent Application No. 2005-001222, the disclosure of which is incorporated by reference herein.

BACKGROUND OF THE INVENTION

1. Field of the Invention

The present invention relates to a webbing retractor which structures a seat belt device for a vehicle.

2. Description of the Related Art

There are webbing retractors equipped with a spool (take-up shaft) on which webbing is taken-up, an acceleration detecting mechanism having an acceleration sensor detecting the acceleration of a vehicle, and a pretensioner mechanism forcibly rotating the spool in a webbing take-up direction at the time of an emergency of a vehicle (see, for example, Japanese Patent Application Laid-Open (JP-A) No. 8-133015).

In this webbing retractor, the pretensioner mechanism is disposed at one side of the frame, whereas the acceleration detecting mechanism is disposed at the other side of the frame, such that the balance of the arrangement of the mechanisms (the balance in terms of space) at the one side and the other side of the frame is good.

In such a webbing retractor, there are cases in which other mechanisms requiring a certain amount of space for placement are added, such as, for example, a motor retractor mechanism which takes-up the webbing at the time when a collision of the vehicle is predicted, or the like. In such cases, for example, the balance of the placement of the mechanisms can be made to be good by placing this other mechanism at one side of the frame, and placing both the pretensioner mechanism and the acceleration detecting mechanism at the other side of the frame.

The pretensioner mechanism described above has, for example, a pinion provided coaxially with respect to the take-up shaft, a cylinder provided in the vicinity of the pinion, and a piston provided movably within the cylinder. At the time of an emergency of the vehicle, due to gas being supplied to one side of the piston within the cylinder and the piston moving toward the other side, a rack formed at the piston meshes-together with the pinion, and rotates the pinion in the take-up direction. A clutch is provided at the pinion. When the pinion rotates, the pinion and the take-up shaft are connected via the clutch, and the take-up shaft is rotated in the take-up direction.

Moreover, in the pretensioner mechanism, generally, a small gas venting hole is formed in the flange portion of the piston, and the high-pressure gas supplied to the interior of the cylinder is exhausted via this gas venting hole. In this way, it is possible to prevent the gas pressure within the cylinder from rising extremely.

However, in a case in which both the pretensioner mechanism and the acceleration detecting mechanism (the acceleration sensor and the like) are disposed at the same side of the spool as described above, some type of measure must be taken in order for the gas, which is exhausted from the gas venting hole of the piston, to not affect the acceleration detecting mechanism.

SUMMARY OF THE INVENTION

In view of the aforementioned, an object of the present invention is to provide a webbing retractor which can prevent gas, which is for rotating a take-up shaft in a take-up direction, from affecting other structural parts.

In order to overcome the aforementioned problem, a first aspect of the present invention is a webbing retractor having a pretensioner mechanism which rotates a take-up shaft in a take-up direction by gas pressure, the webbing retractor including: a guide wall guiding exhausting direction of the gas exhausted from the pretensioner mechanism in a predetermined direction.

In the webbing retractor of the first aspect, when the pretensioner mechanism operates, the take-up shaft is rotated in the take-up direction by the gas pressure. The direction of exhausting of the gas, which is exhausted from the pretensioner mechanism, is guided in a predetermined direction by the guide wall. In this way, the exhausted gas can be prevented from affecting other structural parts.

A webbing retractor of a second aspect of the present invention includes: a take-up shaft around which a webbing for restraining a vehicle occupant is wound so as to be able to be taken-up thereon and pulled-out therefrom; a lock member provided so as to be able to engage with the take-up shaft, the lock member impeding rotation of the take-up shaft in a pull-out direction in a state in which the lock member is engaged with the take-up shaft; an acceleration detecting mechanism provided at one axial direction side of the take-up shaft, and detecting a moving acceleration of the webbing retractor and/or a pull-out acceleration of the webbing, and causing the lock member to engage with the take-up shaft on the basis of results of detection; a pretensioner mechanism provided in a vicinity of the acceleration detecting mechanism, moving a piston by gas pressure within a cylinder and rotating the take-up shaft in a take-up direction; and a blocking wall provided at a pretensioner mechanism side with respect to the acceleration detecting mechanism, and blocking blowing-out of exhausted gas toward the acceleration detecting mechanism.

In the webbing retractor of the second aspect, the acceleration detecting mechanism, which is provided at one axial direction side of the take-up shaft, detects the moving acceleration of the webbing retractor (acceleration of a vehicle) and/or the pull-out acceleration of the webbing, and, on the basis of the results of detection, causes the lock member to engage with the take-up shaft. Rotation of the take-up shaft in the pull-out direction is thereby impeded.

Further, when gas is supplied to the interior of the cylinder of the pretensioner mechanism which is provided in a vicinity of the acceleration detecting mechanism, due to the pressure of the gas, the piston moves and the take-up shaft is rotated in the take-up direction. The gas venting hole is formed in the piston, and the gas, which is supplied to the interior of the cylinder, is exhausted from this gas venting hole.

Here, the blocking wall is provided at the pretensioner mechanism side with respect to the acceleration detecting mechanism. The blowing-out of the gas, which is exhausted from the gas venting hole of the piston, toward the acceleration detecting mechanism is blocked by this blocking wall. In this way, the exhausted gas can be prevented from affecting the acceleration detecting mechanism (another structural part).

A webbing retractor relating to a third aspect of the present invention includes: a take-up shaft around which a webbing for restraining a vehicle occupant is wound so as to be able to be taken-up thereon and pulled-out therefrom; an acceleration sensor provided at one axial direction side of the take-up shaft, and detecting a moving acceleration of the webbing retractor; a cylinder formed in a tube shape, and provided in a vicinity of the acceleration sensor; a piston having a flange portion, which is movably fit with an inner surface of the cylinder and in which is formed a gas venting hole which passes through from one side to the other side, and a rack bar, which extends toward the other side of the flange portion, and at a predetermined time, by gas being supplied to the one side of the flange portion within the cylinder, the piston moves toward the other side while exhausting gas from the gas venting hole; a pinion provided coaxially with the take-up shaft, and due to the pinion meshing-together with the rack bar and being rotated at a time when the piston moves, the pinion connects with the take-up shaft and rotates the take-up shaft in a take-up direction; and a blocking wall provided between the pinion and the acceleration sensor, and blocking blowing-out of exhausted gas toward the acceleration sensor.

In the webbing retractor of the third aspect, the acceleration sensor, which is provided at one axial direction side of the take-up shaft, detects the moving acceleration of the webbing retractor. Further, the cylinder is provided in a vicinity of the acceleration sensor, and the flange portion of the piston is movably fit with the inner surface of the cylinder. Due to gas being supplied to the one side of the flange portion within the cylinder at the predetermined time, the piston moves toward the other side while exhausting the gas from the gas venting hole formed in the flange portion. Therefore, the rack bar, which extends toward the other side of the flange portion, meshes-together with the pinion, which is provided coaxially with respect to the take-up shaft, and rotates the pinion in the take-up direction. In this way, the take-up shaft is rotated in the take-up direction, and the webbing is taken-up.

Here, the blocking wall is provided between the pinion and the acceleration sensor. The blowing-out of the gas, which is exhausted from the gas venting hole of the piston, toward the acceleration sensor is blocked by this blocking wall. In this way, the exhausted gas can be prevented from affecting the acceleration sensor (another structural part).

A webbing retractor relating to a fourth aspect of the present invention has the feature that, in the webbing retractor of the third aspect, the blocking wall is formed integrally with a gear case which is formed of resin, which is provided between the take-up shaft and the pinion and which holds an axial direction position of the take-up shaft at a predetermined position, and the blocking wall stands erect toward an opposite side of the take-up shaft.

In the webbing retractor of the fourth aspect, the gear case, which is formed of resin and which holds the axial direction position of the take-up shaft at a predetermined position, is provided between the take-up shaft and the pinion. The blocking wall stands erect integrally at the gear case, toward the opposite side of the take-up shaft. The blowing-out of the gas, which is exhausted from the gas venting hole of the piston, toward the acceleration sensor is blocked by this blocking wall. Because of the structure in which the blocking wall is formed integrally with the resin gear case in this way, manufacturing of the blocking wall is easy.

In a webbing retractor relating to a fifth aspect of the present invention according to the first aspect, the webbing retractor further includes an acceleration detecting mechanism which detects a moving acceleration of the webbing retractor and a pull-out acceleration of the webbing, and the guide wall guides exhausting direction of the gas exhausted from the pretensioner mechanism in the predetermined direction except for a direction toward the acceleration detecting mechanism.

In a webbing retractor relating to a sixth aspect of the present invention according to the first aspect, the webbing retractor further includes an acceleration sensor which detects a moving acceleration of the webbing retractor, and the guide wall guides exhausting direction of the gas exhausted from the pretensioner mechanism in the predetermined direction except for a direction toward the acceleration sensor.

In a webbing retractor relating to a seventh aspect of the present invention according to the third aspect, one end of the blocking wall extends to the other side of the flange portion.

In a webbing retractor relating to an eighth aspect of the present invention according to the second aspect, the pretensioner mechanism, while exhausting gas, which is supplied to an interior of the cylinder, from a gas venting hole formed in the piston, moves the piston by gas pressure within the cylinder.

As described above, the webbing retractor relating to the present invention can prevent gas, which is for rotating a take-up shaft in a take-up direction, from affecting other structural parts.

BRIEF DESCRIPTION OF THE DRAWINGS

Embodiments of the invention will be described in detail with reference to the following figures, wherein.

DETAILED DESCRIPTION OF THE INVENTION

Figure 3:
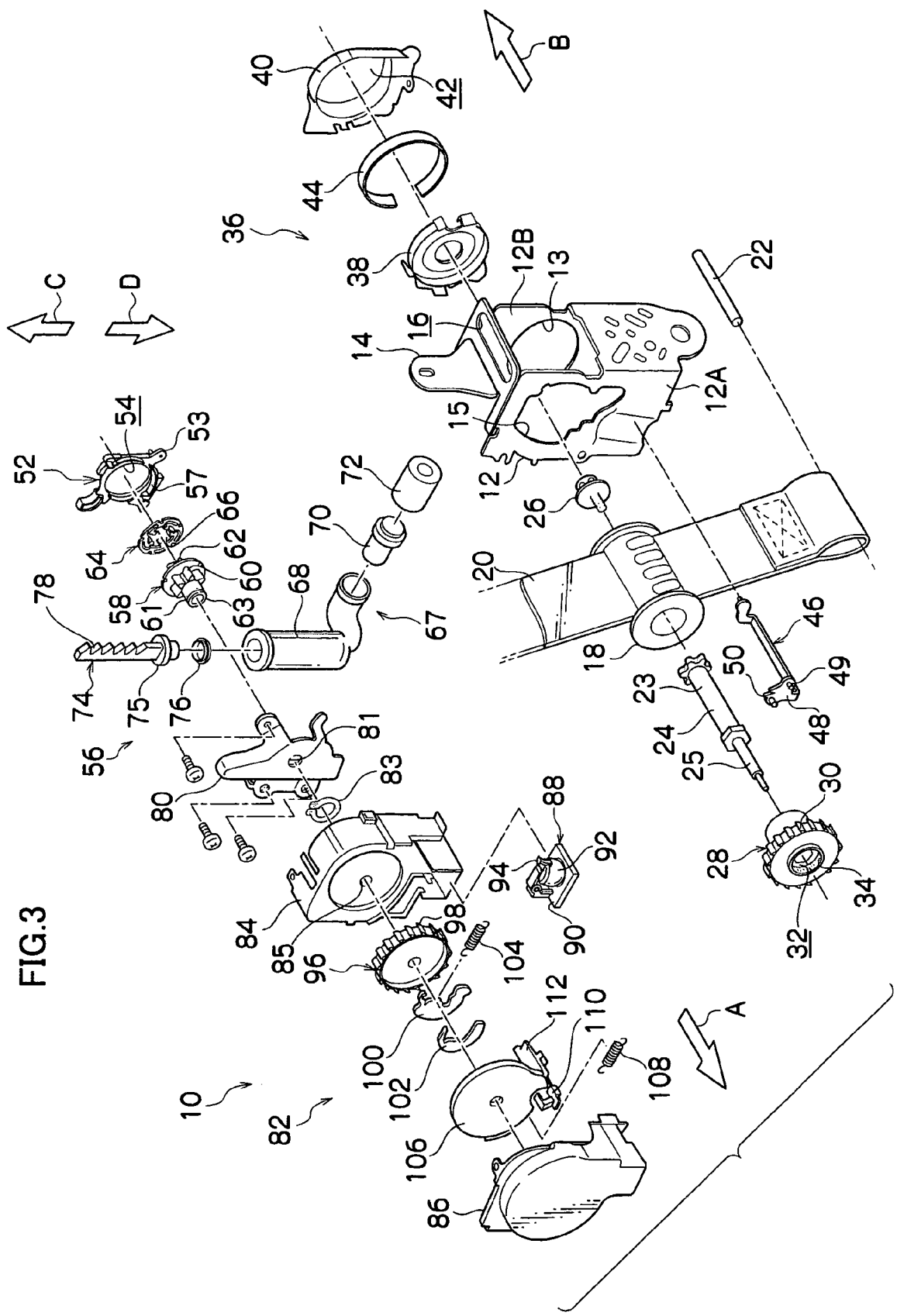
FIG. 3 is an exploded perspective view showing the overall structure of the webbing retractor relating to the embodiment of the present invention.

The structure of a webbing retractor 10 relating to an embodiment of the present invention is shown in an exploded perspective view in FIG. 3.

The webbing retractor 10 relating to the present embodiment has a frame 12 which is shaped as a substantially U-shaped plate as seen in top view. The frame 12 is fixed in a vehicle passenger compartment. A connecting piece 14 spans between the top end of one side wall 12A and the top end of another side wall 12B of the frame 12. The connecting piece 14 is fixed in the vehicle passenger compartment, and an insert-through hole 16 is formed in the connecting piece 14. A substantially circular through-hole 15 is formed in the one side wall 12A of the frame 12, and a circular through-hole 13 is formed in the other side wall 12B.

A cylindrical-tube-shaped spool 18 serving as a take-up shaft is supported so as to be freely rotatable between the one side wall 12A and the other side wall 12B of the frame 12. The proximal end portion of an elongated belt-shaped webbing 20 for restraining a vehicle occupant is anchored to the spool 18 by a cylindrical shaft 22. When the spool 18 is rotated in one direction around the axis thereof (hereinafter, this direction will be called the "take-up direction"), the webbing 20 is taken-up from the proximal end side thereof onto the outer peripheral portion of the spool 18. On the other hand, when the webbing 20 is pulled from the distal end side thereof, accompanying this, the webbing 20 is pulled-out as the spool 18 rotates (hereinafter, the direction of rotation of the spool 18 at the time when the webbing 20 is pulled-out will be called the "pull-out direction").

A torsion shaft 24 (energy absorbing member), which structures a force limiter mechanism, is disposed at the axially central portion of the spool 18. The torsion shaft 24 is formed of a metal material such as iron or the like, and has a torsionally deforming portion 23 and a pivot portion 25. The torsionally deforming portion 23 can torsionally deform due to the application of a torsional load of a predetermined value or more. The pivot portion 25 is provided coaxially and integrally with an axial direction one end portion (arrow A direction side end portion) of the torsionally deforming portion 23. The pivot portion 25 passes through the through-hole 15 of the one side wall 12A in a non-contacting state, and projects-out toward the outer side (the arrow A direction side) of the frame 12.

A screw member 26 is screwed together with an axial direction other end portion (arrow B direction side end portion) of the torsionally deforming portion 23. This axial direction other end portion of the torsionally deforming portion 23 and an axial direction other end portion (arrow B direction side end portion) of the spool 18 are connected integrally by this screw member 26. The torsion shaft 24 thereby rotates integrally with the spool 18.

A lock gear 28, which structures a force limiter mechanism, is provided at the axial direction one side (arrow A direction side) of the spool 18. The lock gear 28 is disposed within the through-hole 15 of the one side wall 12A, and is anchored to the axial direction one end portion (the arrow A direction side end portion) of the torsionally deforming portion 23. At times other than when the torsionally deforming portion 23 is torsionally deformed, the lock gear 28 rotates integrally with the torsion shaft 24 and the spool 18. Ratchet teeth 30 are formed at the outer periphery of the lock gear 28. A circular knurled hole 32 is formed in the central portion of the lock gear 28. The knurled hole 32 opens toward an axial direction one side (the arrow A direction side). The entire inner peripheral surface of the knurled hole 32 is subjected to knurling, such that a knurled surface 34 is formed.

An urging mechanism 36 is provided at the other side (the arrow B direction side) of the frame 12. The urging mechanism 36 has a spring seat 38. The spring seat 38 is mounted to the outer side of the other side wall 12B of the frame 12. The spring seat 38 covers the other side surface of the spool 18 in a state in which the screw member 26 projects-out at the other side of the frame 12. The other side (arrow B direction side) of the spring seat 38 is covered by a spring cover 40, and the spring cover 40 is mounted to the outer side of the other side wall 12B of the frame 12. A substantially cylindrical concave portion 42 is formed in the spring cover 40, and opens toward one side (the arrow A direction side).

A spiral spring 44 is provided within the concave portion 42 of the spring cover 40. The outer side end of the spiral spring 44 is fixed to the inner peripheral surface of the concave portion 42. The inner side end of the spiral spring 44 is fixed to the screw member 26. The spiral spring 44 urges the torsion shaft 24, the spool 18, and the lock gear 28 in the take-up direction via the screw member 26.

Figure 2:
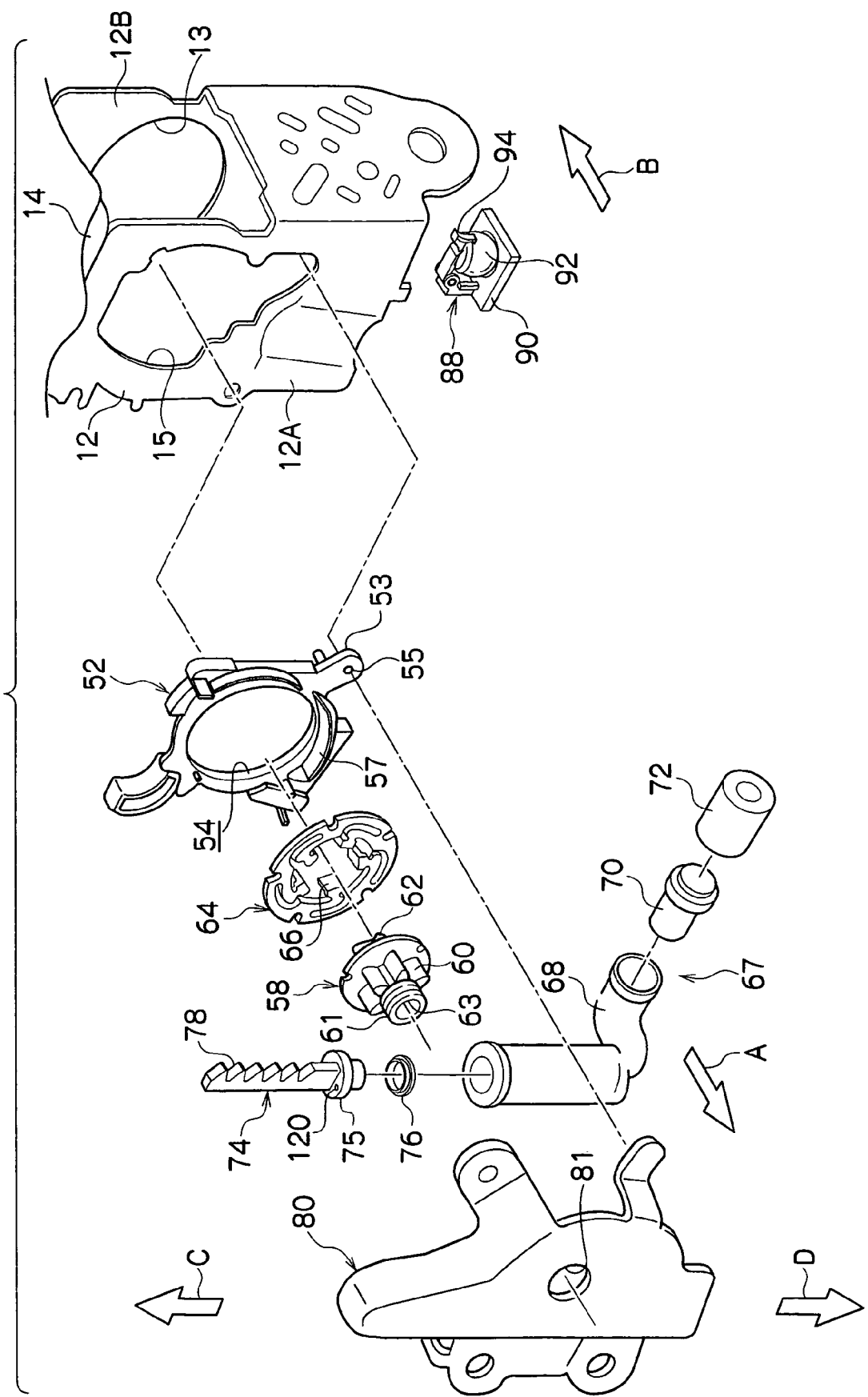
FIG. 2 is an exploded perspective view showing the structure of main portions of the webbing retractor relating to the embodiment of the present invention.

A gear case 52 made of resin is provided at the outer side (arrow A direction side) of the one side wall 12A of the frame 12. The gear case 52 covers the axial direction one side (arrow A direction side) of the lock gear 28, and holds the lock gear 28, i.e., the axial direction position of the spool 18, at a predetermined position. A circular hole 54 is formed in the central portion of the gear case 52, and the circular hole 54 exposes the knurled hole 32 of the lock gear 28. Further, a substantially plate-shaped supporting portion 53 is formed integrally with the diagonally lower portion of the gear case 52, and, as shown in FIG. 2, a circular supporting hole 55 is formed so as to pass through the supporting portion 53. This supporting hole 55 corresponds to a locking member 46 which will be described later.

Figure 1:
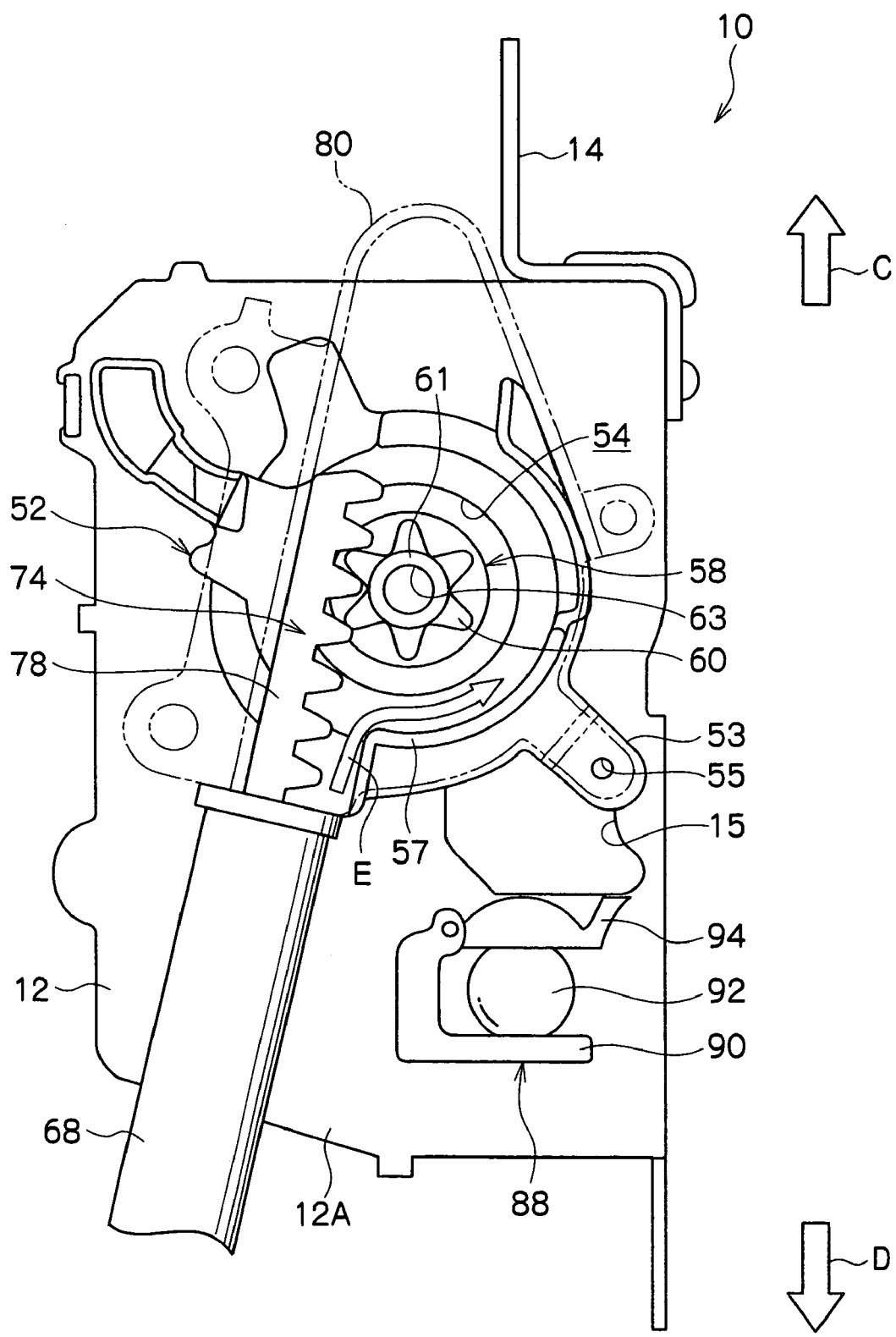
FIG. 1 is a side view showing the structure of main portions of a webbing retractor relating to an embodiment of the present invention.

As shown in FIG. 1 as well, a blocking wall 57, which is formed in the shape of an arc which is concentric with the circular hole 54, stands erect integrally at the diagonally lower portion of the circular hole 54, toward one side of the gear case 52 (in FIG. 1, the near side (the surface side) in the direction orthogonal to the surface of the figure, i.e., the arrow A direction side in FIGS. 2 and 3). One end portion (the lower end portion) in the curving direction of the blocking wall 57 is curved toward the radial direction outer side of the circular hole 54, and extends to the outer peripheral portion (the lower end portion) of the gear case 52. As shown in FIG. 1, in the present embodiment, the one end portion (the lower end portion) of the blocking wall 57 extends in the vicinity of another side of a flange portion 75 of a piston, which will be described later.

The locking member 46 spans between the one side wall 12A and the other side wall 12B of the frame 12. Movement of the locking member 46 toward the other side (the arrow B direction side) is impeded by the other side wall 12B of the frame 12. A lock plate 48 is provided at the one side end (the arrow A direction side end portion) of the locking member 46. The lock plate 48 is disposed diagonally downward of the lock gear 28. A circular-shaft-shaped rotation shaft 49 is formed integrally at one end (the arrow D direction side end portion) of the lock plate 48. Due to the rotation shaft 49 being inserted through the supporting hole 55 (see FIG. 2) of the gear case 52, the lock plate 48 is rotatably supported by the supporting portion 53 of the gear case 52 at the rotation shaft 49. Lock teeth 50 are formed at the other end (the arrow C direction side end portion) of the lock plate 48. The lock plate 48 is disposed at the opposite side of the loch gear 28 (the side away from the lock gear 28), and the lock teeth 50 are in a state in which they cannot mesh-together with the ratchet teeth 30 of the lock gear 28.

The pretensioner mechanism 56 is provided at the outer side of the one side wall 12A of the frame 12 (the side opposite the side at which the spool 18 is located). The pretensioner mechanism 56 has a pinion 58 which is disposed coaxially with respect to the spool 18 at one side (the arrow A direction side) of the gear case 52. The pinion 58 is formed of a metal material such as iron or the like, and has a gear portion 60 at which pinion teeth are formed at the outer peripheral portion thereof.

A cylindrical-tube-shaped cam portion 62 is provided coaxially and integrally at the axial direction other side (the arrow B direction side) of the gear portion 60. Convex and concave portions are formed alternately at the outer periphery of the cam portion 62. The cam portion 62 is inserted into the knurled hole 32 via the circular hole 54 of the gear case 52, and the lock gear 28 can rotate independently of the pinion 58 without the cam portion 62 contacting the knurled surface 34. The cam portion 62 corresponds to a clutch plate 64 which will be described later.

A rotating pivot portion 61, which is shaped as a cylindrical tube, is provided coaxially and integrally with an axial direction one side (arrow A direction side) of the gear portion 60. The rotating pivot portion 61 passes-through a circular hole 81 formed in a cover plate 80 which will be described later, and is anchored by a snap ring 83, such that the pinion 58 is rotatably supported by the cover plate 80.

A circular hole portion 63, which passes-through along the axial direction, is formed in the axially central portion of the pinion 58 (the gear portion 60, the cam portion 62, and the rotating pivot portion 61). The pivot portion 25 of the torsion shaft 24 passes coaxially through the hole portion 63. Note that the inner diameter of the hole portion 63 is formed to be sufficiently larger than the outer diameter of the pivot portion 25 of the torsion shaft 24, such that the pivot portion 25 passes-through the hole portion 63 in a state in which it does not contact the hole portion 63.

On the other hand, the pretensioner mechanism 56 has the clutch plate 64. The clutch plate 64 is disposed between the gear case 52 and the pinion 58. Plural meshing claws 66 are formed at the center side of the clutch plate 64. The meshing claws 66 project-out from the clutch plate 64 toward the axial direction other side (the arrow B direction side). The meshing claws 66 mesh-together with the concave portions of the aforementioned cam portion 62, and the clutch plate 64 is thereby mounted to the pinion 58. The meshing claws 66 are, together with the cam portion 62, inserted in the knurled hole 32 via the circular hole 54 of the gear case 52, and the lock gear 28 can rotate independently of the clutch plate 64 without the meshing claws 66 contacting the knurled surface 34.

The pretensioner mechanism 56 has an operation source 67. The operation source 67 has a cylinder 68 which is shaped as a substantially L-shaped cylindrical tube. The cylinder 68 is fixed to the outer side (the arrow A direction side) of the one side wall 12A of the frame 12, beneath the pinion 58. At one side end (the arrow D direction side) of the cylinder 68, a gas generator 70 is provided, and a generator cap 72, which is shaped as a cylindrical tube having a floor, is fixed. The gas generator 70 closes the one side end of the cylinder 68 in the state in which the generator cap 72 is placed thereon.

The operation source 67 has a piston 74 which is formed in the shape of a rod and which is provided within the cylinder 68. The piston 74 has a flange portion 75, which is shaped as a collar and is movably fit-together with the inner surface of the cylinder 68, and a rack bar 78, which is provided so as to extend toward the other side (arrow C direction side) of the flange portion 75. An O-ring 76 is mounted to the one side (arrow D direction side) of the flange portion 75, and seals the region between the cylinder 68 and the one end of the piston 74. A gas venting hole 120, which passes-through from one side to the other side, is formed in the flange portion 75.

On the other hand, the pretensioner mechanism 56 has the cover plate 80 which is formed of a metal material and substantially in the shape of a triangular columnar container. The cover plate 80 is fixed to the outer side (arrow A direction side) of the one side wall 12A. As described above, the pinion 58 is supported rotatably at the circular hole 81 of the cover plate 80. The pivot portion 25, which passes-through the hole portion 63 of the pinion 58, projects-out to one side (the arrow A direction side) of the cover plate 80. The other side (arrow B direction side) and the lower side (arrow D direction side) of the cover plate 80 are open. The cover plate 80 houses, at the interior thereof, the pinion 58, the clutch plate 64, and the upper portion of the piston 74. The gear case 52 is sandwiched between the cover plate 80 and the one side wall 12A of the frame 12.

Here, as shown in FIG. 1, the lower side open portion of the cover plate 80 is, except for the portion thereof corresponding to the other end portion (the arrow C direction side end portion) of the cylinder 68, closed by the blocking wall 57 of the gear case 52.

An acceleration detecting mechanism 82 is provided at one side (the arrow A direction side) of the pretensioner mechanism 56. The acceleration detecting mechanism 82 has a box-shaped sensor holder 84 whose other side (arrow B direction side) is open. The sensor holder 84 is formed of a resin material, and is mounted to the side of the one side wall 12A opposite the side at which the spool 18 is located. A circular shaft-receiving hole 85 is formed in the floor wall of the sensor holder 84. One end portion (the arrow A direction side end portion) of the pivot portion 25 (the torsion shaft 24) which passes-through the hole portion 63 of the pinion 58, is freely rotatably supported by this shaft-receiving hole 85.

One side (the arrow A direction side) of the sensor holder 84 is covered by a box-shaped sensor cover 86 whose other side (arrow B direction side) is open. The sensor cover 86 is fixed to the sensor holder 84 and the one side wall 12A of the frame 12.

An acceleration sensor 88 is held at the lower portion (the arrow D direction side end portion) of the sensor holder 84. The acceleration sensor 88 is disposed in a vicinity of the cylinder 68, and at the side which is opposite the side at which the pinion 58 is located, with respect to the blocking wall 57 of the gear case 52 (the blocking wall 57 is disposed at the pretensioner mechanism 56 side with respect to the acceleration sensor 88).

The acceleration sensor 88 has a placement portion 90. A substantially inverted conical recess is formed at the top surface of the placement portion 90. A spherical body 92 is placed in the recess of the placement portion 90. A movable claw 94 is supported above the spherical body 92 so as to be freely rotatable, and is placed on the spherical body 92.

A V-gear 96 is provided in the space between the sensor holder 84 and the sensor cover 86. The V-gear 96 is integrally connected to an axial direction one end portion (arrow A direction side end portion) of the pivot portion 25, and rotates integrally with the torsion shaft 24. Ratchet teeth 98 are formed at the outer periphery of the V-gear 96.

A W-pawl 100 is rotatably supported at the V-gear 96. A W-mass 102 is fixed to the W-pawl 100. A sensor spring 104 spans between the V-gear 96 and the W-pawl 100. The sensor spring 104 urges the V-gear 96 in the take-up direction with respect to the W-pawl 100.

A substantially disc-shaped gear sensor 106 is provided at one side (the arrow A direction side) of the V-gear 96, in the space between the sensor holder 84 and the sensor cover 86. The gear sensor 106 is rotatably supported at one axial direction end portion of the pivot portion 25. A coil spring 108 spans between the gear sensor 106 and the inner surface of the sensor cover 86, and urges the gear sensor 106 in the take-up direction.

An engaging claw 110 is rotatably supported at one side (the arrow A direction side), at the lower portion (the arrow D direction side end portion) of the gear sensor 106. The central axis of rotation of the engaging claw 110 is parallel to the axial direction of the torsion shaft 24, and the engaging claw 110 can mesh-together with the ratchet teeth 98 of the V-gear 96. Further, a pushing piece 112 is formed at the other side (the arrow B direction side), at the lower portion of the gear sensor 106.

Here, in the webbing retractor 10 relating to the present embodiment, at the time of an emergency of the vehicle (e.g., at a predetermined time such as when the vehicle rapidly decelerates or the like), due to the gas generator 70 of the pretensioner mechanism 56 operating, gas is supplied to one side (the arrow D direction side) of the flange portion 75 (the piston 74) within the cylinder 68. Due to the pressure of the gas, the piston 74, together with the O-ring 76, is moved within the cylinder 68 toward the other side (the pinion 58 side, i.e., the arrow C direction side). As shown in FIG. 1, the rack bar 78 of the moved piston 74 meshes-together with the gear portion 60 of the pinion 58, and the pinion 58 is rotated in the take-up direction due to the movement of the rack bar 78.

Further, here, in the pretensioner mechanism 56, at the time when the piston 74 moves as described above, the gas supplied to the interior of the cylinder 68 is exhausted toward the pinion 58 side via the gas venting hole 120 which is formed in the flange portion 75 of the piston 74. The exhausted gas passes through between the pinion 58 and the blocking wall 57, and is exhausted to the exterior of the device from the upper end side of the cover plate 80 or the like (refer to arrow E in FIG. 1). Namely, the blocking wall 57 functions as a guide wall which guides the direction of exhausting the exhausted gas of the pretensioner mechanism 56 in a predetermined direction.

Operation of the present embodiment will be described next.

In the webbing retractor 10 having the above-described structure, due to the spiral spring 44 of the urging mechanism 36 urging the torsion shaft 24, the spool 18, and the lock gear 28 in the take-up direction via the screw member 26, the webbing 20 is urged in the direction of being taken-up onto the spool 18.

The acceleration sensor 88 of the acceleration detecting mechanism 82 detects that the acceleration of the vehicle (the moving acceleration of the webbing retractor 10) is greater than or equal to a predetermined acceleration. Namely, when the acceleration of the vehicle is greater than or equal to a predetermined acceleration (e.g., when the vehicle rapidly decelerates), the spherical body 92 of the acceleration sensor 88 moves on the recess of the placement portion 90 toward the side opposite the direction of the acceleration, and rises-up, and pushes the movable claw 94 upward. In this way, the movable claw 94 rotates the engaging claw 110 of the gear sensor 106, and causes the engaging claw 110 to mesh-together with the ratchet teeth 98 of the V-gear 96. The gear sensor 106 is thereby set in a state of being connected to the V-gear 96.

The W-pawl 100, the W-mass 102, and the sensor spring 104 of the acceleration detecting mechanism 82 detect that the pull-out acceleration of the webbing 20 (the rotational acceleration of the spool 18 in the pull-out direction) is greater than or equal to a specific acceleration. Namely, when the pull-out acceleration of the webbing 20 is greater than or equal to a specific acceleration, the rotation of the W-pawl 100 and the W-mass 102 in the pull-out direction due to inertia, with respect to the V-gear 96 which is rotated in the pull-out direction via the spool 18 and the torsion shaft 24, is suppressed. The W-pawl 100 and the W-mass 102 are thereby rotated with respect to the V-gear 96. In this way, due to the W-pawl 100 rotating the engaging claw 110 of the gear sensor 106 and causing the engaging claw 110 to mesh-together with the ratchet teeth 98 of the V-gear 96, a state in which the gear sensor 106 is connected to the V-gear 96 arises.

At the time when the state in which the gear sensor 106 is connected to the V-gear 96 arises as described above, due to the pull-out load applied to the webbing 20 from the vehicle occupant, the V-gear 96 and the gear sensor 106 rotate somewhat in the pull-out direction via the spool 18 and the torsion shaft 24. Note that, in this case, the torque of the V-gear 96 and the gear sensor 106 is decreased by the urging force of the sensor spring 104 which increases due to the inertia of the W-pawl 100 and the W-mass 102.

Due to the gear sensor 106 being rotated somewhat in the pull-out direction in this way, the pushing piece 112 of the gear sensor 106 rotates the lock plate 48 of the locking member 46 toward the lock gear 28. In this way, pull-out load is applied from the vehicle occupant to the webbing 20, and torque in the pull-out direction is applied to the spool 18, the torsion shaft 24, and the lock gear 28. The lock teeth 50 of the lock plate 48 thereby mesh-together with the ratchet teeth 30 of the lock gear 28, rotation of the lock gear 28 in the pull-out direction is impeded, and pulling-out of the webbing 20 is impeded.

Moreover, in this state in which the pulling-out of the webbing 20 is impeded in this way, when the torsional load applied from the vehicle occupant to the torsion shaft 24 via the webbing 20 and the spool 18 is greater than or equal to a predetermined value, the force limiter mechanism operates, and, due to the torsionally deforming portion 23 of the torsion shaft 24 torsionally deforming, the spool 18 is rotated in the pull-out direction independently of the lock gear 28. In this way, the webbing 20 is pulled-out, and the load (energy) applied from the webbing 20 to the vehicle occupant is absorbed.

Further, at the time of an emergency of the vehicle (e.g., at a predetermined time such as when the vehicle rapidly decelerates or the like), due to the gas generator 70 of the pretensioner mechanism 56 supplying gas to the one side (arrow D direction side) of the flange portion 75 (the piston 74) within the cylinder 68, the piston 74 is moved within the cylinder 68 toward the other side (the pinion 58 side, i.e., the arrow C direction side) while exhausting the gas from the gas venting hole 120 of the flange portion 75 toward the pinion 58 side. When the piston 74 is moved, the rack bar 78 of the piston 74 meshes-together with the gear portion 60 of the pinion 58, and the pinion 58 is rotated in the take-up direction. Therefore, the pinion 58 is rotated relative to the clutch plate 64, and, due to the meshing claws 66 of the clutch plate 64 meshing-together with the respective convex portions of the cam portion 62 of the pinion 58, the meshing claws 66 of the clutch plate 64 are moved outwardly in the radial direction of the clutch plate 64 and mesh-together with the knurled surface 34 of the lock gear 28. In this way, the pinion 58 is connected to the lock gear 28 via the clutch plate 64, and the pinion 58 is rotated in the take-up direction integrally with the clutch plate 64 and the lock gear 28. The torsion shaft 24 and the spool 18 are thereby rotated in the take-up direction integrally with the lock gear 28, and the webbing 20 is taken-up.

Here, in the webbing retractor 10 relating to the embodiment of the present invention, as described above, at the time when the pretensioner mechanism 56 operates, the gas for operation within the cylinder 68 is exhausted toward the pinion 58 via the gas venting hole (not shown) which is formed in the flange portion 75 of the piston 74. Because the blocking wall 57 is provided between the pinion 58 and the acceleration sensor 88, the exhausted gas passes-through between the pinion 58 and the blocking wall 57, and is exhausted to the exterior of the device from the upper end side of the cover plate 80 or the like (refer to arrow E in FIG. 1). In this way, the blowing-out of the exhausted gas toward the acceleration sensor 88 is blocked, and the exhausted gas can be prevented from affecting the acceleration sensor 88.

Moreover, owing to the blocking wall 57, the blowing-out of the exhausted gas toward the acceleration detecting mechanism 82 (the W-pawl 100, the W mass 102, the sensor spring 104, the gear sensor 106, and the like) also is blocked. Therefore, the exhausted gas can be prevented from affecting the acceleration detecting mechanism 82.

Still further, the blocking wall 57 is formed integrally with the gear case 52, which is formed of resin, which is provided between the lock gear 28 (the spool 18) and the pinion 58 and which holds the axial direction position of the spool 18 at a predetermined position. Therefore, the forming (the molding)

of the blocking wall 57 is easy, and it is easy to form (mold) the blocking wall 57 to be thin. In addition, because the blocking wall 57 and the gear case 52 are integral, as compared with a case in which the blocking wall 57 and the gear case 52 are formed as separate parts, the number of parts can be reduced such that costs can be reduced, and the assembly operation is easy.

As described above, in the webbing retractor 10 relating to the embodiment of the present invention, the gas, which is for rotating the spool 18 in the take-up direction, can be prevented from affecting the acceleration detecting mechanism 82 including the acceleration sensor 88 (i.e., can be prevented from affecting other structural parts).

Note that, in the above-described embodiment, the blocking wall 57 is formed integrally with the gear case 52. However, the present invention is not limited to the same, and, for example, the blocking wall 57 may be formed integrally with the cover plate 80. Or, the blocking wall 57 may be formed integrally with the one side wall 12A of the frame 12.

What is claimed is:

1. A webbing retractor comprising:
   a take-up shaft rotatably mounted between two sides of said retractor around which a webbing for restraining a vehicle occupant is wound so as to be able to be taken-up thereon and pulled-out therefrom;
   an acceleration detecting mechanism provided at one of said sides of the retractor, and detecting a moving acceleration of the webbing retractor and/or a pull-out acceleration of the webbing, and causing a lock member to engage with the take-up shaft on the basis of results of said detection;
   a pretensioner mechanism provided on the same one of said sides of the retractor and in a vicinity of the acceleration detecting mechanism, and having a piston disposed within a cylinder and movable along an axis by gas pressure toward an open end of the cylinder and rotating the take-up shaft in a take-up direction, wherein exhaust gases of said pretensioner mechanism are blown out of said open end of said cylinder;
   a cover plate housing said pretensioner mechanism, and
   a blocking wall provided between said open end of said cylinder and the acceleration detecting mechanism that directs exhausted gas blown out of said open end of said cylinder away from the acceleration detecting mechanism,
   wherein said cover plate has an open portion at a lower side thereof that is attached to one of said sides of said retractor, said pretensioner mechanism is accommodated between said one of said sides of said retractor and said cover plate, said blocking wall is positioned at the open portion of said cover plate, and the open portion of said cover plate is closed by said blocking wall except for a portion corresponding to said open end of the cylinder such that exhaust gas blown out from the open end of the cylinder is directed away from the acceleration detecting mechanism.

2. The webbing retractor of claim 1,
   wherein said blocking wall includes a curved shape portion and guides the gas so as to be exhausted along the curved shape portion.

3. The webbing retractor of claim 2, wherein the blocking wall further includes an edge extending from one end of the curved shape portion toward the open end of the cylinder so as to be closely adjacent to the open end of the cylinder.

4. The webbing retractor of claim 3, wherein the webbing retractor further comprises a pinion provided coaxially with the take-up shaft, and due to the pinion meshing together with a rack bar of the piston and being rotated at a time when the piston moves, the pinion rotates the take-up shaft, and the curved shape portion is curved around the pinion.

5. A webbing retractor comprising:
   a take-up shaft rotatably mounted between two sides of said retractor around which a webbing for restraining a vehicle occupant is wound so as to be able to be taken-up thereon and pulled-out therefrom;
   a lock member provided so as to be able to engage with the take-up shaft, the lock member impeding rotation of the take-up shaft in a pull-out direction in a state in which the lock member is engaged with the take-up shaft;
   an acceleration detecting mechanism provided at, and detecting a moving acceleration of the webbing retractor and/or a pull-out acceleration of the webbing, and causing the lock member to engage with the take-up shaft on the basis of results of detection;
   a pretensioner mechanism provided on the same one of said sides of the retractor in a vicinity of the acceleration detecting mechanism, and having a piston disposed within a cylinder and movable by gas pressure toward an open end of the cylinder and rotating the take-up shaft in a take-up direction, wherein exhaust gases of said pretensioner mechanism are blown out of said open end of said cylinder;
   a cover plate housing said pretensioner mechanism, and
   a blocking wall provided between said open end of said cylinder and the acceleration detecting mechanism that directs exhausted gas blown out of said open end of said cylinder away from the acceleration detecting mechanism, and having an edge closely adjacent to said open end of said cylinder,
   wherein said cover plate has an open portion at a lower side thereof that is attached to one of said sides of said retractor, said pretensioner mechanism is accommodated between said one of said sides of said retractor and said cover plate, said blocking wall is positioned at the open portion of said cover plate, and the open portion of said cover plate is closed by said blocking wall except for a portion corresponding to said open end of the cylinder such that exhaust gas blown out from the open end of the cylinder is directed away from the acceleration detecting mechanism.

6. A webbing retractor comprising:
   a take-up shaft around which a webbing for restraining a vehicle occupant is wound so as to be able to be taken-up thereon and pulled-out therefrom;
   an acceleration sensor provided at one axial direction side of the take-up shaft, and detecting a moving acceleration of the webbing retractor;
   a cylinder formed in a tube shape, and provided in a vicinity of the acceleration sensor, and having an open end;
   a piston having a flange portion, which is movably fit with an inner surface of the cylinder and in which is formed a gas venting hole which passes through from one side to the other side, and a rack bar, which extends toward the other side of the flange portion, and at a predetermined time, by gas being supplied to the one side of the flange portion within the cylinder, the piston moves toward the other side toward said open end of the cylinder while exhausting gas from the gas venting hole such that exhausting gas is ultimately blown out of the open end of the cylinder;
   a pinion provided coaxially with the take-up shaft, and due to the pinion meshing-together with the rack bar and being rotated at a time when the piston moves, the pinion connects with the take-up shaft and rotates the take-up shaft in a take-up direction;

a cover plate housing said pretensioner mechanism, and a blocking wall provided between the pinion and the acceleration sensor, and having an edge closely adjacent to said open end of said cylinder, such that said wall directs exhausted gas away from the acceleration sensor and around a side of said pinion, wherein said cover plate has an open portion at a lower side thereof that is attached to one of said sides of said retractor, said pretensioner mechanism is accommodated between said one of said sides of said retractor and said cover plate, said blocking wall is positioned at the open portion of said cover plate, and the open portion of said cover plate is closed by said blocking wall except for a portion corresponding to said open end of the cylinder such that exhaust gas blown out from the open end of the cylinder is directed away from the acceleration detecting mechanism.

7. The webbing retractor of claim 6, wherein the blocking wall is formed integrally with a gear case which is formed of resin, which is provided between the take-up shaft and the pinion.

8. The webbing retractor of claim 6, wherein an edge of the blocking wall extends to the other side of the flange portion.

* * * * *